(12) United States Patent
Sakaguchi et al.

(10) Patent No.: US 10,211,492 B2
(45) Date of Patent: Feb. 19, 2019

(54) ELECTRONIC APPARATUS

(71) Applicant: Panasonic Intellectual Property Management Co., Ltd., Osaka (JP)

(72) Inventors: Yoshiya Sakaguchi, Kyoto (JP); Kazuo Kimura, Osaka (JP); Kazuhiko Kubo, Hokkaido (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 317 days.

(21) Appl. No.: 15/033,899

(22) PCT Filed: Dec. 17, 2014

(86) PCT No.: PCT/JP2014/006300
§ 371 (c)(1),
(2) Date: May 2, 2016

(87) PCT Pub. No.: WO2015/114717
PCT Pub. Date: Aug. 6, 2015

(65) Prior Publication Data
US 2016/0285141 A1    Sep. 29, 2016

(30) Foreign Application Priority Data

Jan. 29, 2014 (JP) .................. 2014-014038

(51) Int. Cl.
| | | |
|---|---|---|
| G06F 1/20 | (2006.01) |
| H01M 10/617 | (2014.01) |
| H01M 10/623 | (2014.01) |
| H01M 10/653 | (2014.01) |
| H01M 10/658 | (2014.01) |
| H01M 10/667 | (2014.01) |
| H01M 10/6554 | (2014.01) |

(52) U.S. Cl.
CPC .......... *H01M 10/617* (2015.04); *G06F 1/203* (2013.01); *H01M 10/623* (2015.04);
(Continued)

(58) Field of Classification Search
CPC ............. H01M 10/617; H01M 10/653; H01M 10/623; H01M 10/667; H01M 10/6554; G06F 1/203
See application file for complete search history.

(56) References Cited

U.S. PATENT DOCUMENTS

2010/0072952 A1    3/2010 Nakajima
2011/0064983 A1*   3/2011 Yokoyama .......... H01M 2/1066
                                                              429/100

(Continued)

FOREIGN PATENT DOCUMENTS

CN    1881675 A     12/2006
CN    102781199 A   11/2012
(Continued)

OTHER PUBLICATIONS

International Search Report of PCT application No. PCT/JP2014/006300 dated Mar. 17, 2015.
(Continued)

*Primary Examiner* — Eugenia Wang
(74) *Attorney, Agent, or Firm* — McDermott Will & Emery LLP

(57) ABSTRACT

An electronic apparatus includes a heat generating component, a first battery, a second battery, a heat conductive sheet, and a heat insulating layer. The second battery is disposed between the heat generating component and the first battery. The heat conductive sheet thermally couples the heat generating component to the first battery. The heat insulating layer is disposed between the heat conductive sheet and the second battery.

6 Claims, 2 Drawing Sheets

(52) U.S. Cl.
CPC ....... *H01M 10/653* (2015.04); *H01M 10/658* (2015.04); *H01M 10/6554* (2015.04); *H01M 10/667* (2015.04)

(56) References Cited

U.S. PATENT DOCUMENTS

| | | | | |
|---|---|---|---|---|
| 2013/0136966 A1* | 5/2013 | Bhardwaj | .......... | H05K 7/20481 |
| | | | | 429/94 |
| 2013/0236753 A1* | 9/2013 | Yue | .................... | H01M 2/1077 |
| | | | | 429/62 |
| 2015/0064514 A1* | 3/2015 | Wu | .................... | H01M 10/658 |
| | | | | 429/56 |
| 2016/0013527 A1* | 1/2016 | Rich | .................. | H01M 10/623 |
| | | | | 429/96 |

FOREIGN PATENT DOCUMENTS

| | | |
|---|---|---|
| EP | 2637248 | 9/2013 |
| JP | 2007-013701 | 1/2007 |
| JP | 2008-131512 | 6/2008 |
| JP | 2011-054366 | 3/2011 |
| JP | 2013-004468 | 1/2013 |
| JP | 2013-187159 | 9/2013 |
| JP | 2013-242904 | 12/2013 |

OTHER PUBLICATIONS

English Translation of Chinese Search Report dated Dec. 18, 2017 for the related Chinese Patent Application No. 201480065710.0.

* cited by examiner

ELECTRONIC APPARATUS

CROSS-REFERENCE TO RELATED APPLICATIONS

This application is a U.S. national stage application of the PCT International Application No. PCT/JP2014/006300 filed on Dec. 17, 2014, which claims the benefit of foreign priority of Japanese patent application 2014-014038 filed on Jan. 29, 2014, the contents all of which are incorporated herein by reference.

TECHNICAL FIELD

The present invention relates to an electronic apparatus such as a tablet-type computer that includes a plurality of secondary batteries

BACKGROUND ART

Electronic apparatuses have been sophisticated in these years, and this sophistication causes the electronic apparatuses to generate a greater heat amount, so that some countermeasures for this heat generation are needed. Use of a heat conductive sheet is one of these countermeasures. This heat conductive sheet is used for diffusing and dissipating the heat generated in the heat generating components. For instance, Patent literature 1 discloses the use of this heat conductive sheet.

CITATION LIST

Patent Literature

PTL 1: Unexamined Japanese Patent Application No. 2013-242904

SUMMARY OF THE INVENTION

The present invention provides an electronic apparatus that can diffuse efficiently the heat generated therein, and can reduce a difference in temperature between each of secondary batteries for preventing the secondary batteries from deteriorating.

The electronic apparatus of the present invention includes a radiator, a heat generating component, a first battery, and a second battery. The radiator includes (i) a heat conductive sheet having a first section, a second section, and a third section disposed between the first section and the second section, and (ii) a heat insulating layer provided to the third section of the heat conductive sheet. The heat generating component is thermally coupled to the first section, and the first battery is thermally coupled to the second section. The second battery is provided to a side of the heat insulating layer, the side of the heat insulating layer being away from the third section of the heat conductive sheet. In other words, the electronic apparatus of the present invention includes the heat generating component, the first battery, the second battery, the heat conductive sheet, and the heat insulating layer. The second battery is disposed between the heat generating component and the first battery. The heat conductive sheet thermally couples the heat generating component to the first battery. The heat insulating layer is disposed between the heat conductive sheet and the second battery.

The foregoing structure permits a part of the heat generated in the heat generating component to travel as radiation heat to the second battery, and allows most of the heat to travel to the first battery through the heat conductive sheet. The presence of the heat insulating layer between the third section of the heat conductive sheet and the second battery allows little of the heat having traveled through the heat conductive sheet to arrive at the second battery. This structure thus dissipates efficiently the heat generated in the heat generating component, and yet reduces a difference in temperature between the batteries. As a result, the foregoing structure prevents the batteries from being degraded in the characteristics.

DESCRIPTION OF EMBODIMENT

Prior to description of an embodiment of the present invention, a problem of a conventional electronic apparatus is described hereinafter. The electronic apparatus, such as a tablet-type computer having a plurality of secondary batteries, encounters this problem: a temperature of one of the secondary batteries closer to a heat generating component rises due to the heat from the heat generating component, so that a difference in temperature between the secondary batteries occurs. The temperature difference between the secondary batteries causes each of the batteries to progress differently in degradation in characteristics. As a result, the service life of the secondary batteries as a whole is shortened.

An electronic apparatus employing radiator 20 in accordance with the embodiment of the present invention is demonstrated hereinafter with reference to the accompanying drawings.

Figure 1:
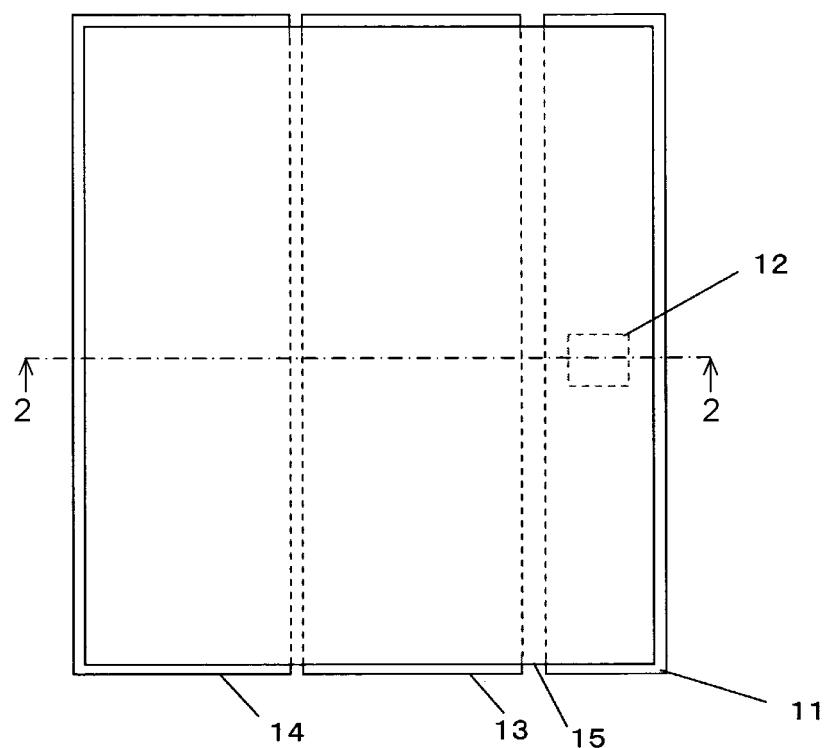
FIG. 1 is an inside top view of an electronic apparatus employing a radiator in accordance with an embodiment of the present invention.
Figure 2:
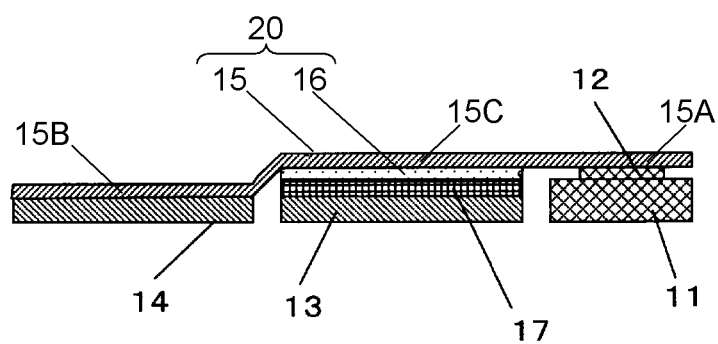
FIG. 2 is a sectional view along line 2-2 in FIG. 1.

FIG. 1 and FIG. 2 are an inside top view and a sectional view of the electronic apparatus employing radiator 20, respectively. As FIG. 2 shows, radiator 20 includes heat conductive sheet 15 and heat insulating layer 16. Heat conductive sheet 15 includes first section 15A, second section 15B, and third section 15C disposed between first section 15A and second section 15B. Heat insulating layer 16 is provided to (or on) third section 15C of heat conductive sheet 15. The electronic apparatus includes radiator 20, heat generating component 12, first battery 14, and second battery 13. Heat generating component 12 is thermally coupled to first section 15A, and first battery 14 is also thermally coupled to second section 15B. Second battery 13 is provided to a side of heat insulating layer 16 away from third section 15C. In other words, the electronic apparatus includes heat generating component 12, first battery 14, second battery 13, heat conductive sheet 15, and heat insulating layer 16. Second battery 13 is disposed between heat generating component 12 and first battery 14. Heat conductive sheet 15 thermally couples heat generating component 12 to first battery 14. Heat insulating layer 16 is disposed between heat conductive sheet 15 and second battery 13.

Each of the structural elements discussed above is detailed hereinafter. Heat generating component 12 is, for instance, an integrated circuit (IC) and mounted to substrate 11. First battery 14 and second battery 13 are, for instance, lithium ion secondary batteries. Heat generating component 12, second battery 13, and first battery 14 are disposed in this order on a straight line. Heat conductive sheet 15 is disposed over these three structural elements.

Heat conductive sheet 15 is, for instance, a graphite sheet, and brought into contact with heat generating component 12 as well as contact with first battery 14, whereby heat conductive sheet 15 thermally couples heat generating component 12 to first battery 14. Heat insulating layer 16 is disposed between heat conductive sheet 15 and second battery 13.

As heat conductive sheet 15, a pyrolytic graphite sheet having a thickness of approx. 25 μm can be employed. As heat insulating layer 16, a sheet of non-woven fabric impregnated with silica and having a thickness of approx. 100 μm can be employed. The heat conductivity of heat conductive sheet 15 in plane direction is approx. 1600 W/m·K, and that of heat insulating layer 16 is approx. 0.03 W/m·K. The heat conductivity of heat insulating layer 16 is preferably 0.2 W/m·K or less, and more preferably 0.1 W/m·K or less.

The structure discussed above allows a part of the heat generated in heat generating component 12 to travel as radiation heat to second battery 13; however, most of the heat travels to first battery 14 via heat conductive sheet 15.

Heat insulating layer 16 is disposed between third section 15C of heat conductive sheet 15 and second battery 13, so that the heat having traveled through heat conductive sheet 15 hardly arrives at second battery 13. This structure thus allows dissipating the heat generated in heat generating component 12 efficiently, and yet reducing a difference in temperature between first battery 14 and second battery 13. As a result, this structure prevents the first battery 14 and second battery 13 from being degraded in the characteristics.

It is preferable to provide infrared ray reflecting layer 17 between heat insulating layer 16 and second battery 13. Infrared ray reflecting layer 17 refers to a layer which radiates (or reflects) the infrared ray having a wavelength of 10 μm at a rate of 0.1 or less. As infrared ray reflecting layer 17, for instance, aluminum foil, or a polyethylene terephthalate (PET) tape deposited with metal such as aluminum can be employed. The surface roughness of layer 17 is fined or micronized for lowering the infrared radiation (or reflection) rate.

In the case of using heat conductive sheet 15 made from graphite sheet, heat conductive sheet 15 tends to radiate the heat having traveled thereto as infrared ray, so that the energy in the form of infrared ray tends to travel to second battery 13 despite the presence of heat insulating layer 16. To overcome this problem, infrared ray reflecting layer 17 is provided between heat insulating layer 16 and second battery 13, whereby the infrared ray emitted from heat conductive sheet 15 reflects from infrared ray reflecting layer 17 and is prevented from traveling to second battery 13.

It is preferable to avoid providing a heat insulating layer on a side of heat conductive sheet 15 away from second battery 13. This structure allows the heat generated in heat generating component 12 to dissipate to the side away from second battery 13 and first battery 14.

In FIGS. 1 and 2, each of second battery 13 and first battery 14 is a single battery and independent of each other; however, a plurality of battery units can be integrated into one pack. In this case, a battery unit closest to the heat generating component is handled as second battery 13, and heat insulating layer 16 is provided at a place confronting this battery unit, whereby advantages similar to what are discussed above are obtainable.

Figure 3:
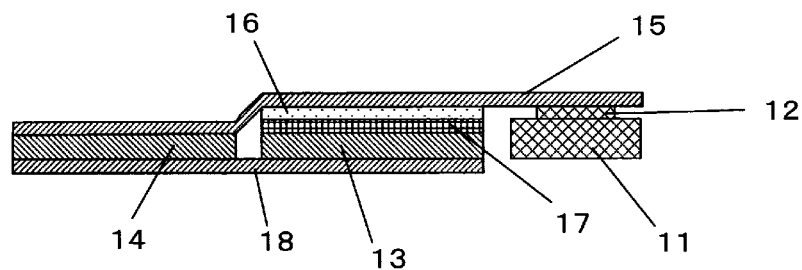
FIG. 3 is a sectional view of another electronic apparatus in accordance with the embodiment of the present invention.

FIG. 3 is a sectional view of another electronic apparatus in accordance with the embodiment. In this structure, in addition to heat conductive sheet 15 shown in FIG. 2, second heat conductive sheet 18 is provided on surfaces of first battery 14 and second battery 13 away from heat conductive sheet 15.

In other words, second heat conductive sheet 18 is thermally coupled to (i) a surface of first battery 14 away from the surface to which heat conductive sheet 15 is connected, and (ii) a surface of second battery 13 away from the surface to which heat insulating layer 16 is disposed.

Second heat conductive sheet 18 thermally couples first battery 14 to second battery 13. This structure allows further reducing the difference in temperature between first battery 14 and second battery 13.

Figure 4:
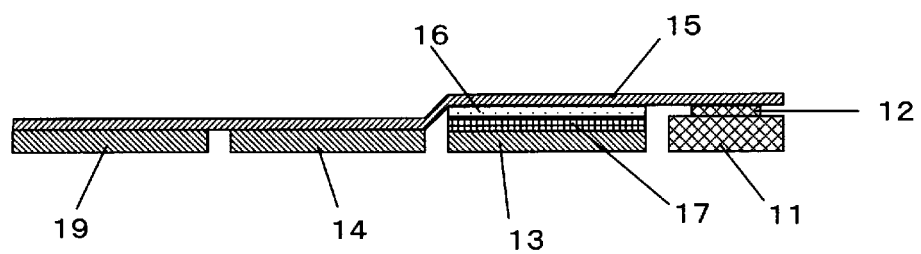
FIG. 4 is a sectional view of still another electronic apparatus in accordance with the embodiment of the present invention.

FIG. 4 is a sectional view of still another electronic apparatus in accordance with the embodiment. In this structure, heat generating component 12 and three batteries are disposed on a straight line. In this case, second battery 13 is disposed closest to heat generating component 12, first battery 14 is next to closest to heat generating component 12, and third battery 19 is disposed farther from heat generating component 12 than first battery 14. Heat conductive sheet 15 is thermally coupled to heat generating component 12, first battery 14, and third batter 19. Heat insulating layer 16 is disposed between heat conductive sheet 15 and second battery 13. This structure allows the heat generated in heat generating component 12 to diffuse efficiently, and yet, this structure allows reducing a difference in temperature between the batteries. Use of four or more batteries also produce advantages similar to what are discussed above, and in this case, an additional battery is disposed farther from heat generating component 12 than third battery 19.

As heat conductive sheet 15, a sheet other than the graphite sheet can be employed. Examples of such a sheet include a laminated sheet formed of a graphite sheet on which both surfaces PET films are bonded. This kind of laminated sheets can be handled with ease rather than the graphite sheet.

In this case, it is important that heat insulating layer 16 is thicker than each of the PET films covering both the surfaces of the graphite sheet, and has a smaller heat conductivity than the PET film.

In the case of using only one battery close to the heat generating component, the heat insulating layer is provided between this battery and the heat conductive sheet, and this sheet is thermally coupled to a housing or the like at a place farther from the heat generating component than the battery. To be more specific, in the case of the structure shown in FIG. 2, when second battery 13 is used but first battery 14 is not used, heat insulating layer 16 is provided between second battery 13 and heat conductive sheet 15, and second section 15B is thermally coupled to the housing or the like. This structure produces advantages similar to what are discussed previously.

INDUSTRIAL APPLICABILITY

The heat dissipation structure of the present invention allows the heat generated in the heat generating component to diffuse efficiently, and yet, allows reducing a difference in temperature between the batteries, whereby the batteries can be prevented from deteriorating. The heat dissipation structure of the present invention is thus useful for industrial applications.

11 substrate
12 heat generating component
13 second battery
14 first battery
15 heat conductive sheet
15A first section
15B second section
15C third section
16 heat insulating layer
17 infrared ray reflecting layer
18 second heat conductive sheet
19 third battery
20 radiator

The invention claimed is:

1. An electronic apparatus comprising:
   a heat generating component;
   a first battery;
   a second battery disposed between the heat generating component and the first battery;
   a first heat conductive sheet which thermally couples the heat generating component to the first battery; and
   a heat insulating layer disposed between the first heat conductive sheet and the second battery.

2. The electronic apparatus according to claim 1, further comprising:
   an infrared ray reflecting layer disposed between the heat insulating layer and the second battery.

3. The electronic apparatus according to claim 1, wherein the first heat conductive sheet includes a graphite sheet.

4. The electronic apparatus according to claim 1, wherein the heat insulating layer is formed of a sheet having a heat conductivity of 0.2 W/m·K or less.

5. The electronic apparatus according to claim 4, wherein the heat insulating layer is formed of a sheet including non-woven fabric and silica impregnated into the non-woven fabric.

6. The electronic apparatus according to claim 1, further comprising:
   a second heat conductive sheet thermally coupled to (i) a face of the first battery, the face of the first battery being away from the first heat conductive sheet, and (ii) a face of the second battery, the face of the second battery being away from the heat insulating layer.

* * * * *